Figure 1:
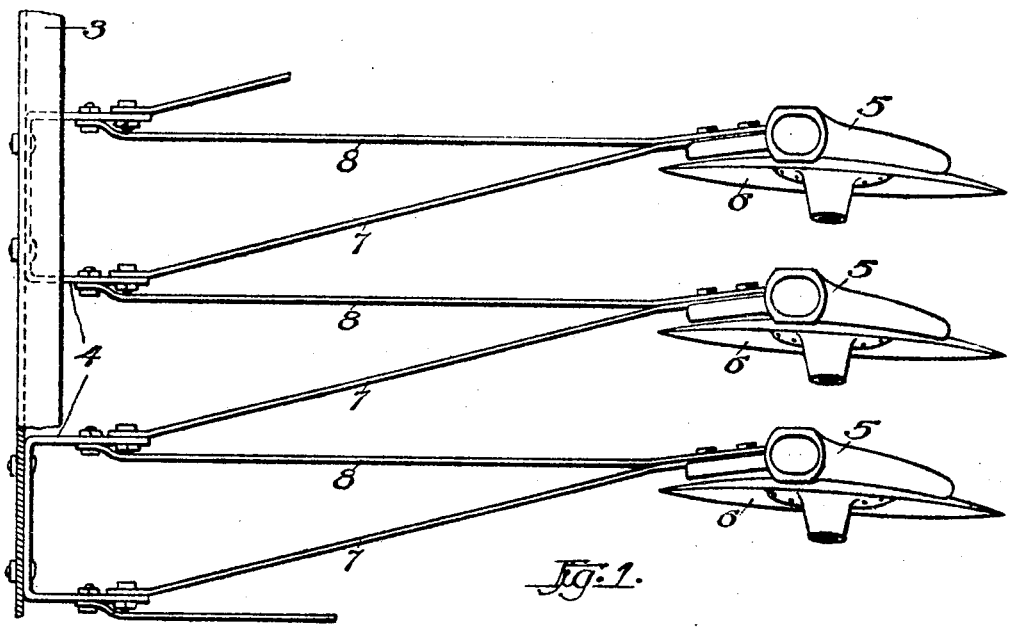

No. 795,248. PATENTED JULY 18, 1905.
H. J. CASE.
DRAG BAR CONNECTION FOR GRAIN DRILLS.
APPLICATION FILED FEB. 25, 1905.

Witnesses:
P. H. Hynds
F. W. Hoffmeister

Inventor:
Henry J. Case
By E. W. Burgess
Attorney

No. 795,248. Patented July 18, 1905.

UNITED STATES PATENT OFFICE.

HENRY J. CASE, OF OWASCO, NEW YORK, ASSIGNOR TO INTERNATIONAL HARVESTER COMPANY, A CORPORATION OF NEW JERSEY.

DRAG-BAR CONNECTION FOR GRAIN-DRILLS.

SPECIFICATION forming part of Letters Patent No. 795,248, dated July 18, 1905.

Application filed February 25, 1905. Serial No. 247,392.

*To all whom it may concern:*

Be it known that I, HENRY J. CASE, a citizen of the United States, residing at the town of Owasco, in the county of Cayuga and State of New York, have invented certain new and useful Improvements in Drag-Bar Connections for Grain-Drills, of which the following is a specification, reference being had to the accompanying drawings, forming a part thereof.

My invention relates to drag-bar connections for grain-drills; and it consists in placing the axial line of the pivotal connection of the drag-bars with the main frame of the machine at an angle greater than a right angle or diagonally with the line of draft or forward advance of the machine; and the object of the invention is to provide a connection that will change the angle of the furrow-opener relative to a vertical plane as they are adjusted to a higher or lower plane in the operation of the machine. It has been found desirable in the operation of this class of machines, and particularly those having revolving furrow-opening disks, that such disks be placed at a slight angle with a vertical plane for the purpose of securing a better penetrating result between the disk and the soil, and also desirable that such angle be variable relative to the depth of cut of the disks.

I attain the above result by the mechanism shown in the drawings and described by the specification accompanying this application, in which—

Figure 2:
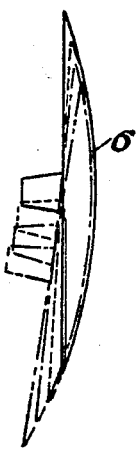

Figure 1 is a plan view of so much of a frame of a seeder with connected drag-bars sufficient to illustrate my invention, and Fig. 2 is a detail of the same.

Like reference-numerals represent like parts.

3 represents a portion of the main frame of a seeder, and 4 represents draft-brackets secured thereto. 5 represents the disk-supports, and 6 represents the disks journaled thereon. The drag-bars, comprising two parts 7 and 8, are secured at their rear ends to the disk-supports and at their forward ends are pivotally connected with the draft-brackets 4. The draft-brackets are substantially U-shaped and each leg is provided with two holes for the reception of the bolts by which the forward ends of the drag-bars are connected therewith, the holes being located one in advance of the other relative to the line of draft of the machine. The drag-bars 7 and 8 are unequal in length and are connected with the draft-brackets at the rear and forward holes, respectively, of the oppositely-disposed legs, resulting in what may be called a "diagonally-arranged pivotal connection" relative to the line of draft.

The brackets are the same in form and are designed to receive the two members of the drag-bar connection between their oppositely-disposed legs when considered singly and between adjacent legs when in series.

The effect produced by the diagonally-arranged pivotal connection of the draft-bars upon the furrow-opening disks is shown in Fig. 2, wherein the upright plane of the disk assumes various angles from the vertical plane as it is raised or lowered.

What I claim as my invention, and desire to secure by Letters Patent, is—

1. In a grain-drill, the combination of a furrow-opener, a drag-bar having its rear end connected therewith and its forward end pivoted to the frame of the machine, the axial line of the pivotal connection being diagonally arranged relative to the line of draft.

2. In a grain-drill, the combination of a furrow-opener, a drag-bar comprising two forwardly-diverging members of unequal length having their rear ends connected therewith and their forward ends connected by means of separate pivots with the frame of the machine and having one of said pivots in advance of the other.

3. In a grain-drill, the combination of a plurality of furrow-openers, drag-bars connected therewith, each of said drag-bars comprising two forwardly-diverging members of unequal length, a main frame member, draft-brackets substantially U-shaped secured thereto with their leg portions projecting rearward and having one short member and one long member of separate drag-bars pivoted to each leg one in advance of the other.

In witness whereof I hereto affix my signature in presence of two witnesses.

HENRY J. CASE.

Witnesses:
A. R. EBINGER,
GEO. W. HENDERSON.